United States Patent
Nagasaka et al.

(10) Patent No.: US 10,182,380 B2
(45) Date of Patent: Jan. 15, 2019

(54) RADIO TERMINAL, COMMUNICATION SYSTEM, AND RADIO BASE STATION

(71) Applicant: KYOCERA CORPORATION, Kyoto (JP)

(72) Inventors: Yushi Nagasaka, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/529,686

(22) PCT Filed: Nov. 19, 2015

(86) PCT No.: PCT/JP2015/082502
§ 371 (c)(1),
(2) Date: May 25, 2017

(87) PCT Pub. No.: WO2016/084690
PCT Pub. Date: Jun. 2, 2016

(65) Prior Publication Data
US 2017/0332297 A1    Nov. 16, 2017

(30) Foreign Application Priority Data

Nov. 27, 2014    (JP) .................................. 2014-240647

(51) Int. Cl.
*H04W 36/00*    (2009.01)
*H04W 36/14*    (2009.01)
*H04W 48/18*    (2009.01)
*H04W 88/06*    (2009.01)

(52) U.S. Cl.
CPC ........... *H04W 36/14* (2013.01); *H04W 48/18* (2013.01); *H04W 88/06* (2013.01)

(58) Field of Classification Search
CPC ......... H04W 36/0083; H04W 36/0088; H04W 36/0094; H04W 36/08; H04W 36/14; H04W 36/16
USPC ....................................................... 455/436
See application file for complete search history.

(56) References Cited

U.S. PATENT DOCUMENTS

| 9,420,503 | B2 * | 8/2016 | Taneja .............. H04W 36/0066 |
| 9,572,087 | B2 | 2/2017 | Nagasaka et al. |
| 2006/0039332 | A1 * | 2/2006 | Kotzin .................. H04W 36/14 370/338 |

(Continued)

FOREIGN PATENT DOCUMENTS

| EP | 2 745 568 B1 | 4/2018 |
| JP | 2007-511147 A | 4/2007 |

(Continued)

OTHER PUBLICATIONS

International Search Report issued in PCT/JP2015/082502; dated Feb. 9, 2016.

(Continued)

*Primary Examiner* — Huy C Ho
(74) *Attorney, Agent, or Firm* — Studebaker & Brackett PC

(57) ABSTRACT

A radio terminal 10 comprises a controller 13 configured to notify, when a condition to perform a switching process of switching a connection target from a mobile communication network to a wireless LAN is satisfied, a source radio base station provided in the mobile communication network of information indicating that the condition to perform the switching process is satisfied.

13 Claims, 9 Drawing Sheets

(56) References Cited

U.S. PATENT DOCUMENTS

| | | |
|---|---|---|
| 2007/0110009 A1 | 5/2007 | Bachmann et al. |
| 2009/0135784 A1 | 5/2009 | Horn et al. |
| 2014/0211626 A1 | 7/2014 | Liu |
| 2015/0358884 A1 | 12/2015 | Nagasaka et al. |
| 2015/0365868 A1 | 12/2015 | Chang et al. |
| 2016/0080998 A1 | 3/2016 | Fukuta et al. |

FOREIGN PATENT DOCUMENTS

| | | |
|---|---|---|
| JP | 2011-504059 A | 1/2011 |
| JP | 2014-530528 A | 11/2014 |
| WO | 2014/074694 A1 | 5/2014 |
| WO | 2014/112477 A1 | 7/2014 |
| WO | 2014/112595 A1 | 7/2014 |
| WO | 2014/112599 A1 | 7/2014 |
| WO | 2014/162905 A1 | 10/2014 |
| WO | 2014/181588 A1 | 11/2014 |

OTHER PUBLICATIONS

3rd Generation Partnership Project; "3rd Generation Partnership Project, Technical Specification Group Radio Access Network, Evolved Universal Terrestrial Radio Access (E-UTRA), User Equipment (UE) procedures in idle mode (Release 12)"; 3GPP TS 36.304 V12.1.0; Jun. 2014; pp. 1-35; 3GPP Organizational Partners.

* cited by examiner

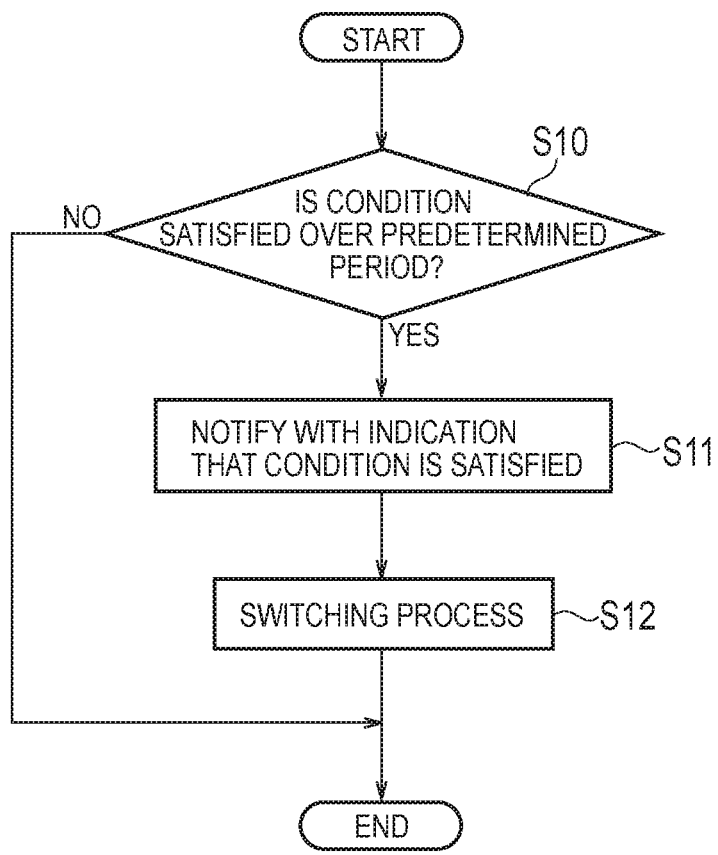

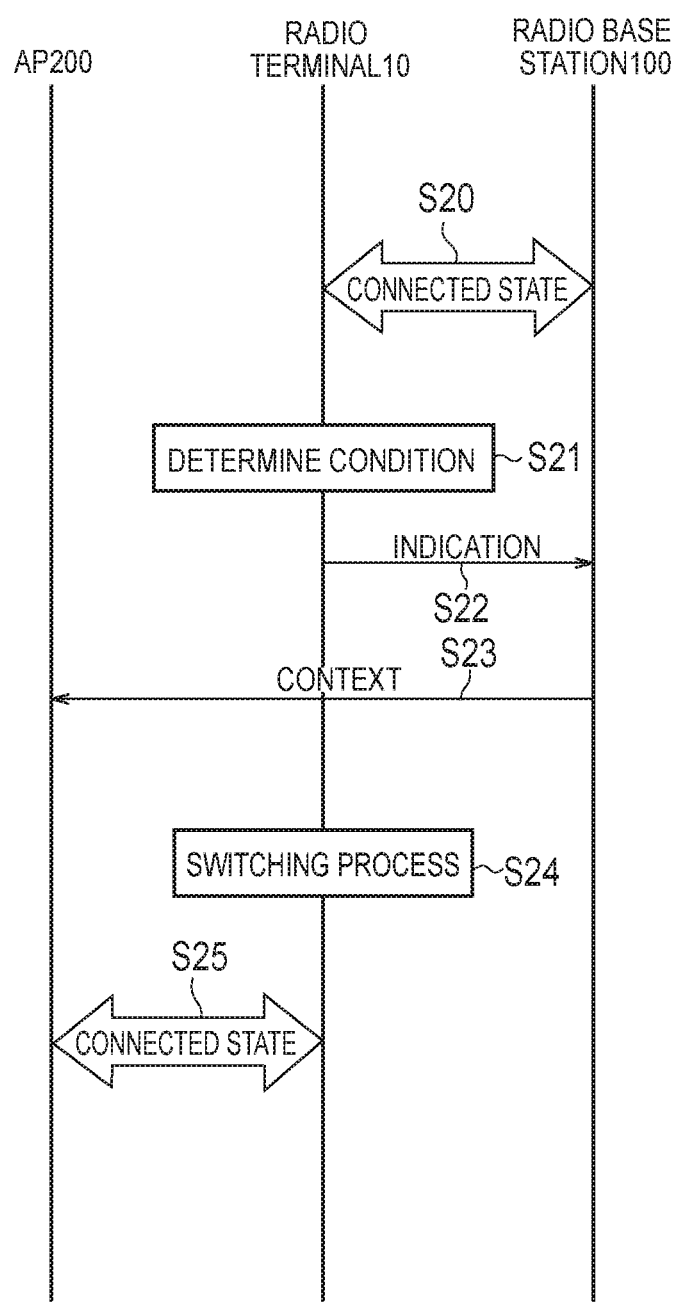

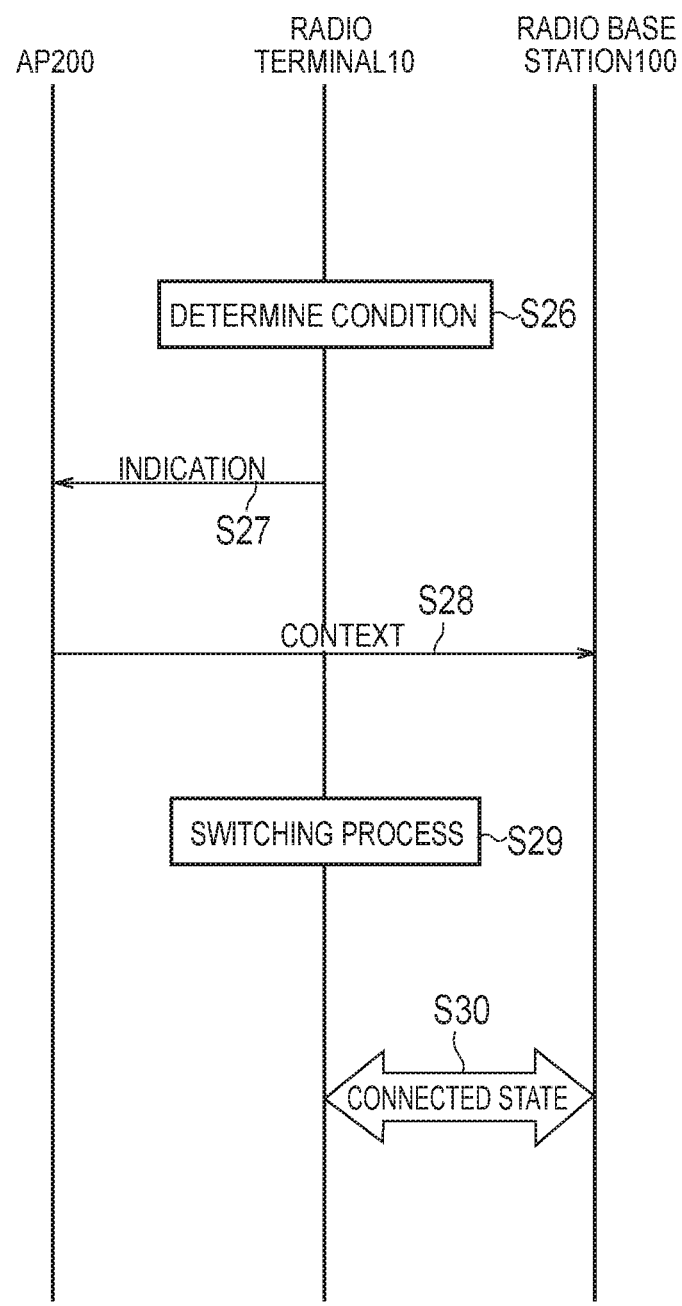

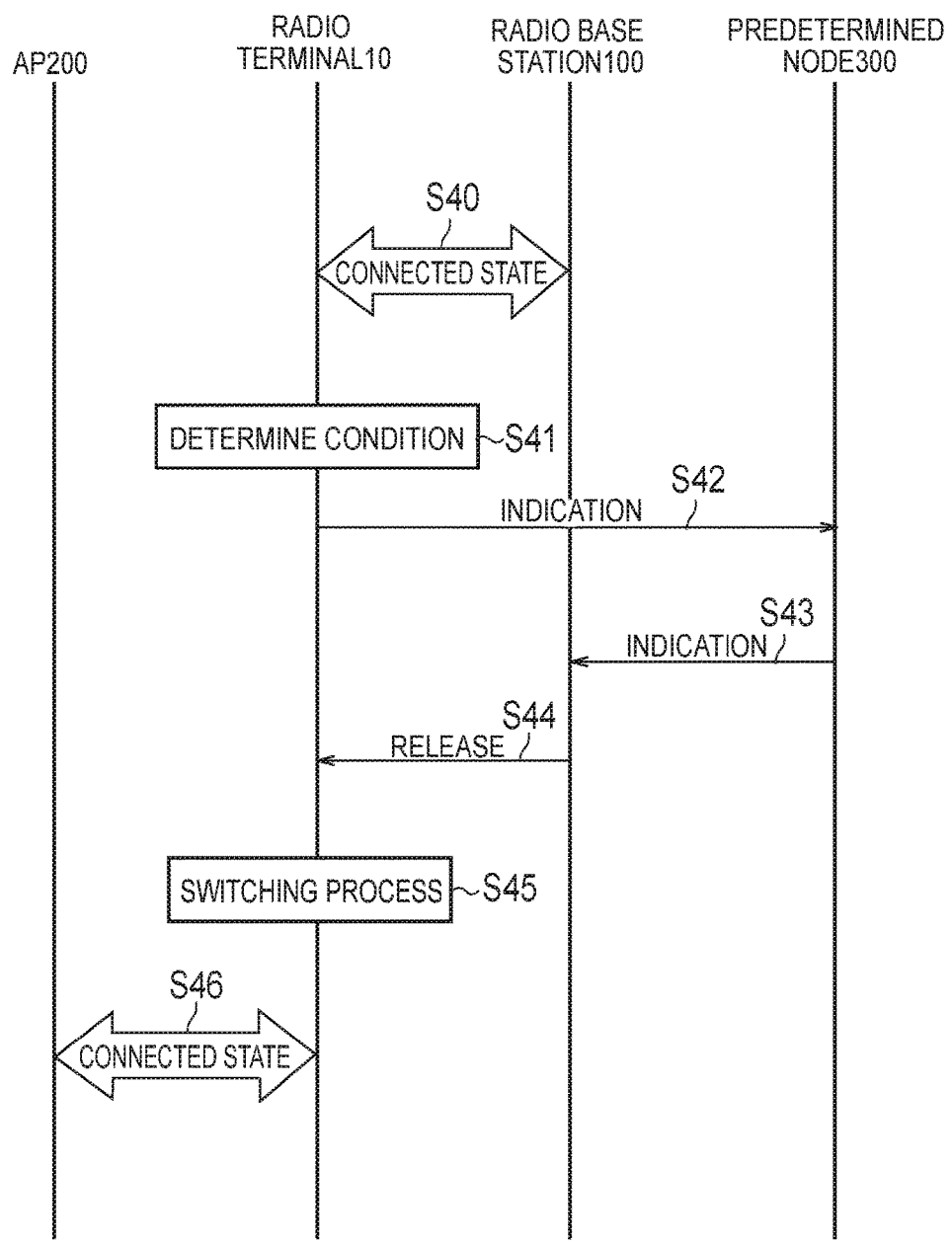

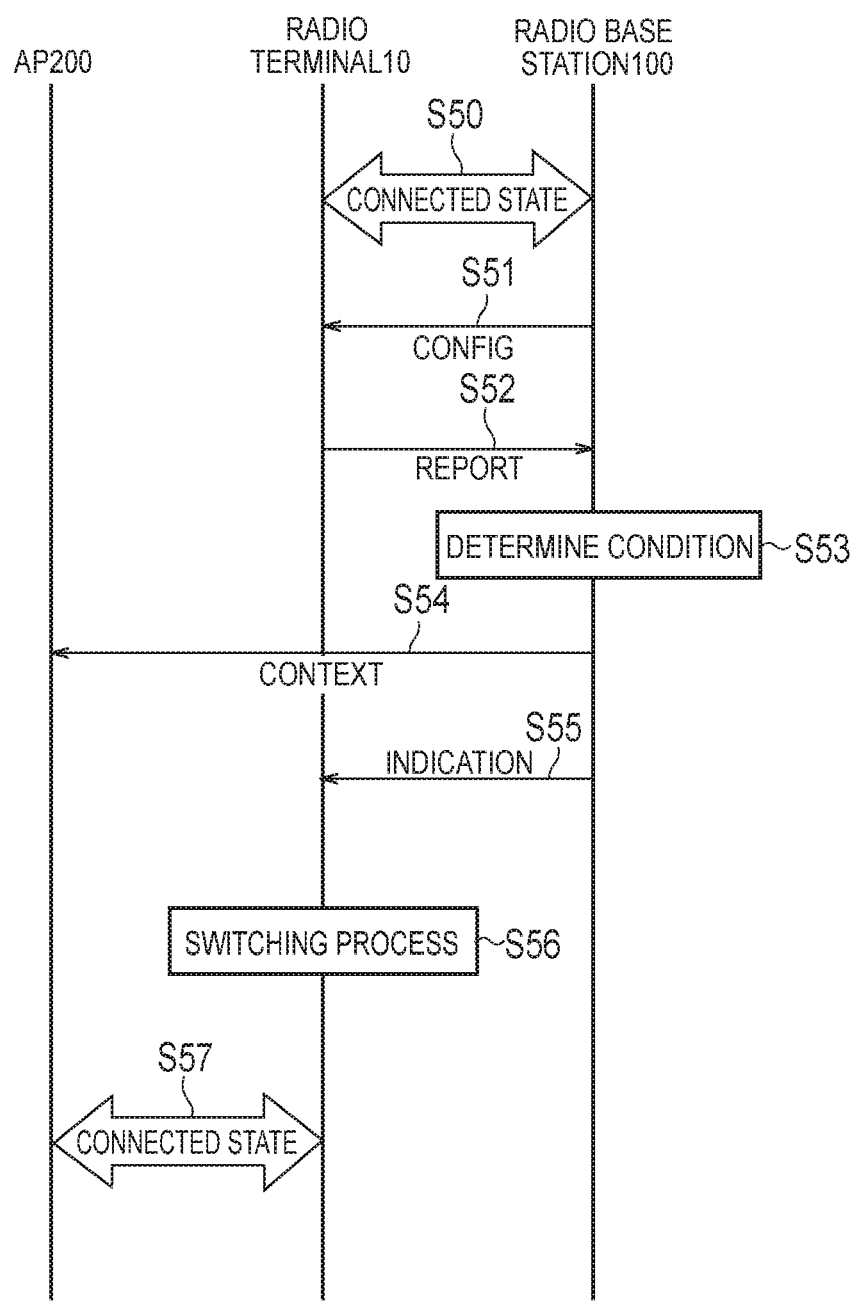

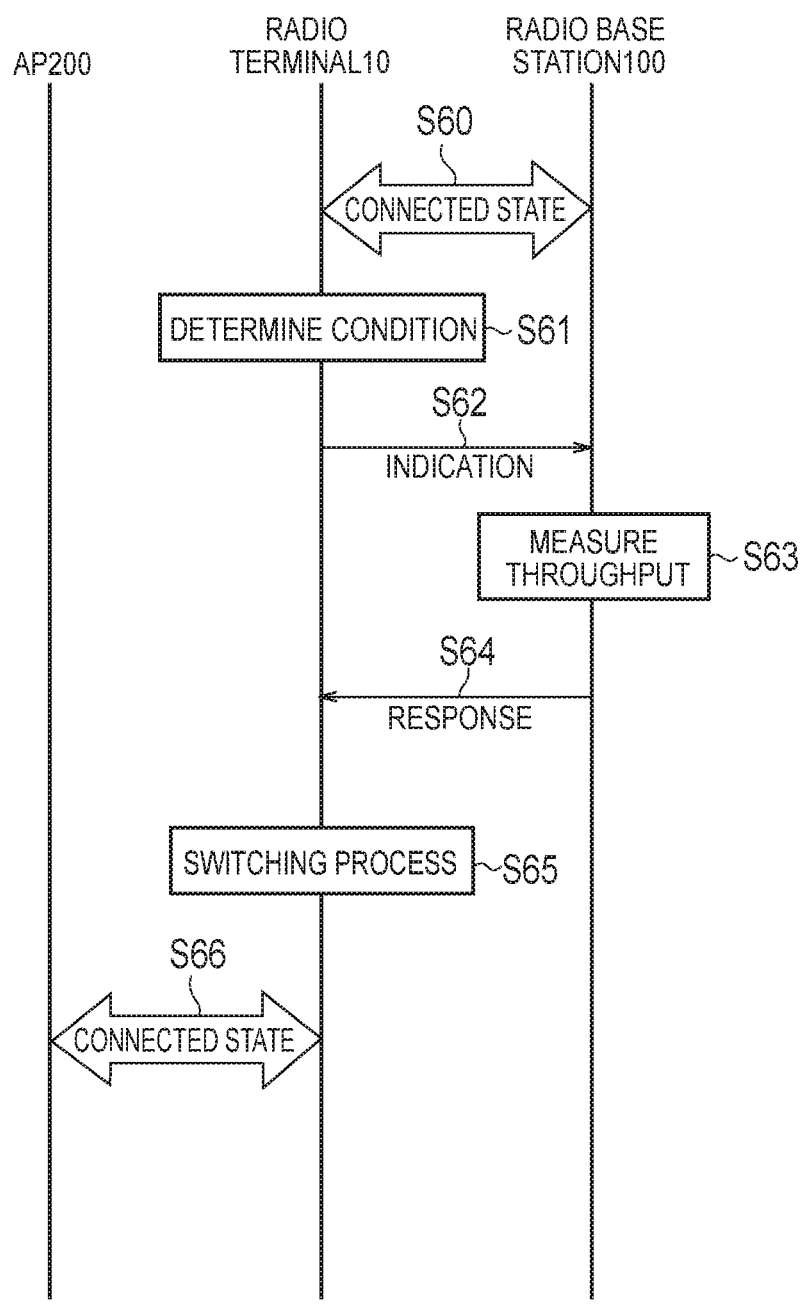

RADIO TERMINAL, COMMUNICATION SYSTEM, AND RADIO BASE STATION

TECHNICAL FIELD

The present application relates to a radio terminal configured to perform a switching process of switching a connection target between a mobile communication network and a wireless LAN, a communication system therefor, and a radio base station therefor.

BACKGROUND ART

There is proposed a switching process (traffic steering) of switching a connection target between a mobile communication network and a wireless LAN when a coverage area of a mobile communication network represented by LTE (Long Term Evolution) and a coverage area of a wireless LAN overlap at least partially. Specifically, the switching process is executed on the basis of whether or not first information at a mobile communication network side satisfies a first condition and second information at a wireless LAN side satisfies a second condition.

Here, the first information at the mobile communication network side is a measurement result (RSRPmeas) of a signal level of a received signal (RSRP; Reference Signal Received Power) and a measurement result (RSRQmeas) of a signal quality of a received signal (RSRQ; Reference Signal Received Quality), for example. The second information at a wireless LAN side is a channel utilization value of a wireless LAN, a backhaul value of a wireless LAN, and a signal intensity of a received signal (RSSI; Received Signal Strength Indicator), for example.

PRIOR ART DOCUMENT

Non-Patent Document

Non Patent Document 1: TS36. S04V12.1.0

SUMMARY OF THE INVENTION

A first aspect is abstracted as a radio terminal comprising a controller configured to perform a switching process of switching a connection target from a mobile communication network to a wireless LAN; and a notification unit configured to notify, when a condition to perform the switching process is satisfied, a source radio base station provided in the mobile communication network of information indicating that the condition to perform the switching process is satisfied.

A second aspect is abstracted as a communication system comprising a radio terminal configured to perform a switching process of switching a connection target from a mobile communication network to a wireless LAN; and a source radio base station provided in the mobile communication network, wherein the radio terminal notifies, when a condition to perform the switching process is satisfied, the source radio base station of information indicating that the condition to perform the switching process is satisfied.

A third aspect is abstracted as a radio base station provided in a mobile communication network, comprising a communication unit configured to transmit, to a radio terminal, measurement setting information indicating that a signal received from a wireless LAN should be measured, and receive, from the radio terminal, a measurement report including at least identification information of a target access point constituting the wireless LAN; and a controller configured to determine, on the basis of the measurement report, whether or not a condition is satisfied to perform a switching process of switching a connection target of the radio terminal from the mobile communication network to the wireless LAN.

BRIEF DESCRIPTION OF THE DRAWINGS

FIG. 6 is a flowchart illustrating a communication method according to the embodiment.

FIG. 7 is a sequence diagram illustrating a communication method according to a first modification.

FIG. 8 is a sequence diagram illustrating the communication method according to the first modification.

FIG. 9 is a sequence diagram illustrating a communication method according to a second modification.

FIG. 10 is a sequence diagram illustrating a communication method according to a third modification.

FIG. 11 is a sequence diagram illustrating a communication method according to a fifth modification.

DESCRIPTION OF THE EMBODIMENT

Figure 1:
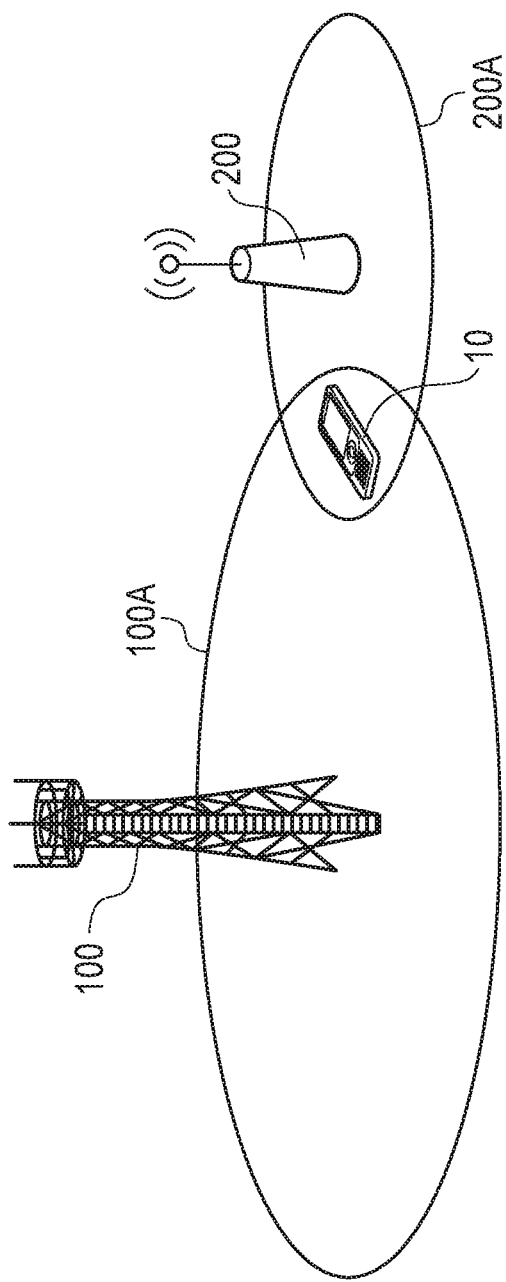
FIG. 1 is a diagram illustrating a communication system 1 according to an embodiment.

A radio terminal and a communication system according to an embodiment of the present application is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

[Overview of Disclosure]

As a result of extensive studies, the inventors, et al., took particular note that when a radio terminal performed the switching process, there was no notification indicating that the switching process was performed from the radio terminal to a radio base station provided in a mobile communication network.

In accordance with such a new finding, it is assumed that in spite of the switching process being performed from the mobile communication network to a wireless LAN, the radio base station maintains context information (UE Context) of the radio terminal. When such an assumption is set as a premise, PDCCH may be notified from the radio base station to the radio terminal, and thus, the radio terminal needs to monitor the PDCCH in a predetermined DRX cycle in spite of having performed the switching process from the mobile communication network to the wireless LAN.

Therefore, the present application has been achieved in order to resolve the above-described problem, and an object thereof is to provide a radio terminal, a communication system, and a radio base station with which it is possible to enable restraint of monitoring of an unnecessary PDCCH when a switching process is performed from a mobile communication network to a wireless LAN.

The radio terminal according to the overview of disclosure comprises a controller configured to perform a switching process of switching a connection target from a mobile communication network to a wireless LAN; and a notification unit configured to notify, when a condition to perform the switching process is satisfied, a source radio base station provided in the mobile communication network of information indicating that the condition to perform the switching process is satisfied.

According to the radio terminal in the overview of disclosure, the notification unit notifies, when the condition to perform the switching process is satisfied, the source radio base station provided in the mobile communication network of information indicating that the condition to perform the switching process is satisfied. Thus, a situation where the source radio base station retains context information (UE Context) of the radio terminal is restrained, and the notification of the PDCCH from the source radio base station to the radio terminal is also restrained. By extension, in a case where the switching process from the mobile communication network to the wireless LAN is performed, it is possible to restrain monitoring by the radio terminal of the unnecessary PDCCH.

[Embodiment]
(Communication system)

A communication system according to an embodiment will be described, below. FIG. 1 is a diagram illustrating a communication system 1 according to the embodiment.

As illustrated in FIG. 1, the communication system 1 includes a radio base station 100 and an access point 200. Further, the communication system 1 includes a radio terminal 10 capable of connecting to the radio base station 100 or the access point 200.

The radio terminal 10 is a terminal such as a cell phone or a tablet computer. The radio terminal 10 has a function of performing radio communication with the access point 200, in addition to a function of performing radio communication with the radio base station 100.

The radio base station 100 has a first coverage area 100A, and in the first coverage area 100A, provides a mobile communication service represented by LTE (Long Term Evolution). The radio base station 100 manages one or a plurality of cells, and the first coverage area 100A is configured by one or a plurality of cells. The radio base station 100 is an entity of a mobile communication network. It is noted that a cell may be thought of as a term to indicate a geographical area, and may also be thought of as a function of performing radio communication with the radio terminal 10.

The access point 200 has a second coverage area 200A, and in the second coverage area 200A, provides a wireless LAN service. The access point 200 is an entity of a wireless LAN. At least a part of the second coverage area 200A overlaps the first coverage area 100A. A whole of the second coverage area 200A may overlap the first coverage area 100A. Generally, the second coverage area 200A is smaller than the first coverage area 100A.

In the embodiment, the access point 200 may be a stationary access point installed in a stationary object such as a shop and an office, and may be a moving access point installed in a moving body such as a vehicle. Type information (WLAN Type) indicating whether the access point 200 is a stationary access point or a moving access point is broadcast from the radio base station 100, for example.

(Application Scene)

In the embodiment, a method of performing a switching process (for example, a traffic steering) of switching a connection target between a mobile communication network and a wireless LAN, will be described. The switching process includes both of: a first switching process of switching a connection target from the mobile communication network to the wireless LAN, and a second switching process of switching a connection target from the wireless LAN to the mobile communication network. It is noted that in the embodiment, a case where the switching process is the first switching process will be described.

Specifically, in the embodiment, when a condition that the first switching process is performed is satisfied over a predetermined period, the first switching process is executed. Therefore, it should be noted that in the embodiment, an event of "a condition to perform the switching process is satisfied" described in the Claims is an event of "the condition that the first switching process is performed over a predetermined period is satisfied". Below, for clarity, "a condition to perform the switching process is satisfied" described in the Claims should be replaced by "a steering condition to the wireless LAN is satisfied". However, an event of "a condition to perform the switching process is satisfied" described in the Claims may be another condition.

In the embodiment, the condition to perform the switching process includes a first condition and a second condition. The first condition is that which should be satisfied by the first information at a mobile communication network side, and the second condition is that which should be satisfied by the second information at a wireless LAN side.

Here, the first information at the mobile communication network side is a measurement result (RSRPmeas) of a signal level of a received signal (RSRP; Reference Signal Received Power) and a measurement result (RSRQmeas) of a signal quality of a received signal (RSRQ; Reference Signal Received Quality), for example.

The second information at the wireless LAN side is a channel utilization value of a wireless LAN (ChannelUtilizationWLAN), a backhaul value of a downlink of a wireless LAN (BackhaulRateDIWLAN), a backhaul value of an uplink of a wireless LAN (BackhaulRateUIWLAN), and a signal level of a received signal (RSSI: Received Signal Strength Indicator), for example.

(First Switching Process from Mobile Communication Network to Wireless LAN)

The first condition that the connection target is switched from the mobile communication network to the wireless LAN is that either one of the following condition (1a) or (1b) is satisfied, for example. It is noted that the first condition may be that all of the following conditions (1a) to (1b) are satisfied.

$$\text{RSRPmeas} < \text{Thresh}_{ServingOffloadWLAN, LowP} \quad (1a)$$

$$\text{RSRQmeas} < \text{Thresh}_{ServingOffloadWLAN, LowQ} \quad (1b)$$

It is noted that "$\text{Thresh}_{ServingOffloadWLAN, LowP}$" and "$\text{Thresh}_{ServingOffloadWLAN, LowQ}$" are threshold values provided from the radio base station 100 or previously determined threshold values.

The second condition that the connection target is switched from the mobile communication network to the wireless LAN is that all of the following conditions (1c) to (1f) are satisfied, for example. It is noted that the second condition may be that any one of the following conditions (1c) to (1f) is satisfied.

$$\text{ChannelUtilizationWLAN} < \text{Thresh}_{ChUtilWLAN,Low} \quad (1c)$$

$$\text{BackhaulRateD1WLAN} > \text{Thresh}_{BackhRateDLWLAN,High} \quad (1d)$$

$$\text{BackhaulRateU1WLAN} > \text{Thresh}_{BackhRateULWLAN,High} \quad (1e)$$

$$\text{RSSI} > \text{Thresh}_{BEACONSRSSI,High} \quad (1f)$$

It is noted that "$\text{Thresh}_{ChUtilWLAN,Low}$", "$\text{Thresh}_{BackhRateDLWLAN,High}$", "$\text{Thresh}_{BackhRateULWLAN,High}$", and "$\text{Thresh}_{BEACONSRSSI,High}$" are threshold values provided from the radio base station 100 or previously determined threshold values.

(Second Switching Process from Wireless LAN to Mobile Communication Network)

The first condition that the connection target is switched from the wireless LAN to the mobile communication network is that the following conditions (2a) and (2b) are satisfied, for example. It is noted that the first condition may be that either one of the following condition (2a) or (2b) is satisfied.

$$\text{RSRPmeas} > \text{Thresh}_{ServingoffloadWLAN,HighP} \quad (2a)$$

$$\text{RSRQmeas} > \text{Thresh}_{ServingOffloadWLAN,HighQ} \quad (2b)$$

It is noted that "$\text{Thresh}_{ServingoffloadWLAN,HighP}$" and "$\text{Thresh}_{ServingoffloadwLAN,HighQ}$" are threshold values provided from the radio base station 100 or previously determined threshold values.

The second condition that the connection target is switched from the wireless LAN to the mobile communication network is that any one of the following conditions (2c) to (2f) is satisfied, for example. It is noted that the second condition may be that all of the following conditions (2c) to (2f) are satisfied.

$$\text{ChannelUtilizationWLAN} > \text{Thresh}_{ChUtilWLAN,High} \quad (2c)$$

$$\text{BackhaulRateD1WLAN} < \text{Thresh}_{BackhRateDLWLAN,Low} \quad (2d)$$

$$\text{BackhaulRateU1WLAN} < \text{Thresh}_{BackhRateULWLAN,Low} \quad (2e)$$

$$\text{RSSI} < \text{Thresh}_{BEACONSRSSI,Low} \quad (2f)$$

It is noted that "$\text{thresh}_{ChUtilWLAN,High}$", "$\text{Thresh}_{BackhRateDLWLAN,Low}$", "$\text{Thresh}_{BackhRateULWLAN,Low}$", and "$\text{Thresh}_{BEACONRSSI,Low}$" are threshold values provided from the radio base station 100 or previously determined threshold values.

(Supplementary Description of Switching Process)

When the above-described threshold values are not provided, the radio terminal 10 may omit acquisition (i.e., reception or measurement) of information in which the threshold values are not provided.

In the embodiment, the above-described various types of threshold values are examples of a determination parameter used for determining whether or not to perform a switching process of switching a connection target between the mobile communication network and the wireless LAN. That is, the determination parameter includes one or more values selected from among "$\text{Thresh}_{ServingoffloadwLAN,LowP}$", "$\text{Thresh}_{ServingOffloadWLAN,LowQ}$", "$\text{Thresh}_{ChUtilWLAN,Low}$", "$\text{Thresh}_{BackhRateDLWLAN,High}$", "$\text{Thresh}_{BackhRateULWLAN,High}$", "$\text{Thresh}_{BEACONSRSSI,High}$", "$\text{Thresh}_{ServingOffloadWLAN,HighP}$", "$\text{Thresh}_{ServingOffloadWLAN,HighQ}$", "$\text{Thresh}_{ChUtilWLAN,High}$", "$\text{Thresh}_{BackhRateDLWLAN,Low}$", "$\text{Thresh}_{BackhRateULWLAN,Low}$", and "$\text{Thresh}_{BEACONSRSSI,Low}$".

Further, the determination parameter includes a predetermined period ($\text{Tsteering}_{WLAN}$) in which a state should continue where the first condition or the second condition is satisfied. The predetermined period ($\text{Tsteering}_{WLAN}$) is a value of seven seconds at a maximum. Alternatively, the determination parameter may include a predetermined period ($\text{Tsteering}_{WLAN}$) referred to in the first switching process from the mobile communication network to the wireless LAN and a predetermined period ($\text{Tsteering}_{EUTTRA}$) referred to in the second switching process from the wireless LAN to the mobile communication network. That is, in addition to the predetermined period ($\text{Tsteering}_{WLAN}$)) referred to in the first switching process, a predetermined period ($\text{Tsteering}_{EUTTRA}$) referred to in the second switching process may be defined.

The determination parameter includes an individual parameter individually notified from the radio base station 100 to the radio terminal 10 and a broadcast parameter broadcast from the radio base station 100 to the radio terminal 10. The individual parameter is included in an RRC message (for example, RRC Connection Reconfiguration) transmitted from the radio base station 100 to the radio terminal 10, for example. The broadcast parameter is included in an SIB (for example, WLAN-OffloadConfig-r12) broadcast from the radio base station 100, for example. It should be noted that when receiving the individual parameter in addition to the broadcast parameter, the radio terminal 10 preferentially applies the individual parameter over the broadcast parameter.

(Radio Terminal)

Figure 2:
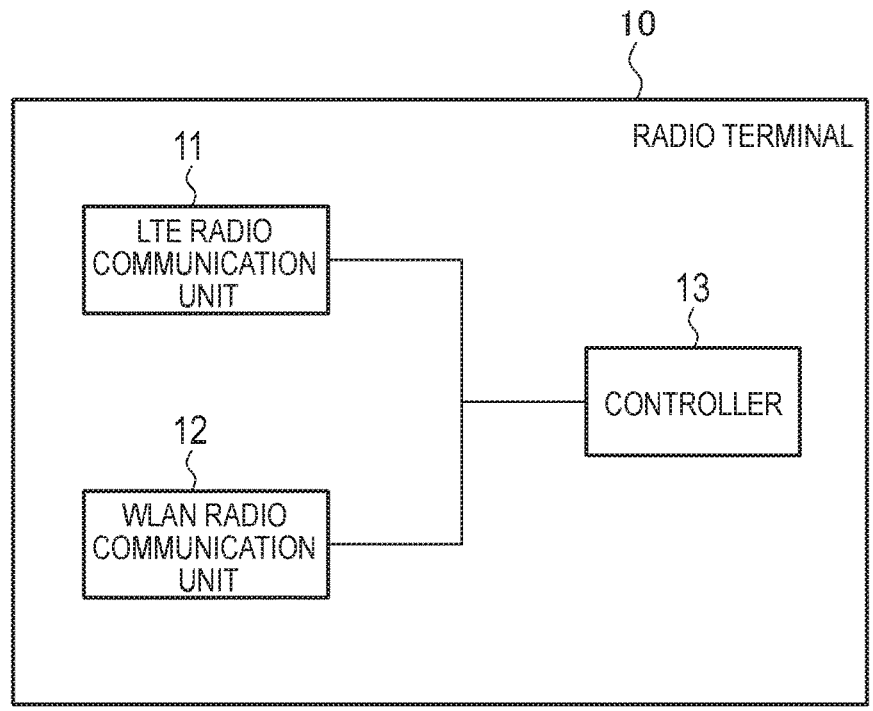
FIG. 2 is a block diagram illustrating a radio terminal 10 according to the embodiment.

A radio terminal according to the embodiment will be described, below. FIG. 2 is a block diagram illustrating the radio terminal 10 according to the embodiment.

As illustrated in FIG. 2, the radio terminal 10 includes an LTE radio communication unit 11, a WLAN radio communication unit 12, and a controller 13.

The LTE radio communication unit 11 has a function of performing radio communication with the radio base station 100. For example, the LTE radio communication unit 11 regularly receives a reference signal from the radio base station 100. The LTE radio communication unit 11 regularly measures a signal level of a reference signal (RSRP) and a signal quality of a reference signal (RSRQ). The LTE radio communication unit 11 receives, as the determination parameter, the individual parameter and the broadcast parameter, from the radio base station 100.

Further, the LTE radio communication unit 11 receives, from the radio base station 100, a list of access points 200 arranged around the radio base station 100. The list of access points 200 is notified by an SIB (WLAN-Id-r12, for example) from the radio base station 100, for example. The list of access points 200 may include type information (WLAN Type) indicating whether the access point 200 is a stationary access point or a moving access point.

The WLAN radio communication unit 12 has a function of performing radio communication with the access point 200. For example, the WLAN radio communication unit 12 receives a beacon or probe response from the access point 200. The beacon or the probe response includes a BBS Load information element, and a channel utilization value of the wireless LAN (ChannelUtilizationWLAN) may be acquired from the BBS Load information element.

The WLAN radio communication unit 12 receives, in response to a request (GAS (Generic Advertisement Service) Request) for the access point 200, a response (GAS Response) returned from the access point 200. The response (GAS Response) includes a backhaul value of a downlink of the wireless LAN (BackhaulRateD1WLAN) and a backhaul value of an uplink of the wireless LAN (BackhaulRateU1WLAN). Such an inquiry procedure is performed in accordance with ANQP (Access Network Query Protocol) defined in Hotspot 2.0 of WFA (Wi-Fi Alliance).

The WLAN radio communication unit 12 receives a signal from the access point 200. The WLAN radio communication unit 12 measures a signal level of the received signal (RSSI). The signal level of the received signal (RSSI) is a signal intensity of the beacon or the probe response.

The controller 13 is configured by a CPU, a memory, and the like, and controls the radio terminal 10. For example, the controller 13 configures a controller configured to perform, when at least a part of a coverage area of the wireless LAN overlaps a coverage area of the mobile communication network, a switching process (the first switching process and the second switching process) of switching a connection destination between the mobile communication network and the wireless LAN. Here, a case where the switching process is the first switching process, will be mainly described.

Specifically, the controller 13 determines whether or not a condition to perform the first switching process (that is, a steering condition to the wireless LAN) is satisfied over a predetermined period. The controller 13 executes the first switching process when the condition to perform the first switching process is satisfied over a predetermined period.

In the embodiment, the controller 13 configures a notification unit configured to notify, when the steering condition to the wireless LAN is satisfied, a source radio base station provided in the mobile communication network of information indicating that the steering condition to the wireless LAN is satisfied (hereinafter, may also be referred to as Indication). The source radio base station is the radio base station 100 to which the radio terminal 10 is connected, before performing the first switching process. The information (Indication) indicating that the steering condition to the wireless LAN is satisfied may be referred to as "move-traffic-to-WLAN indication", for example.

(Radio Base Station)

Figure 3:
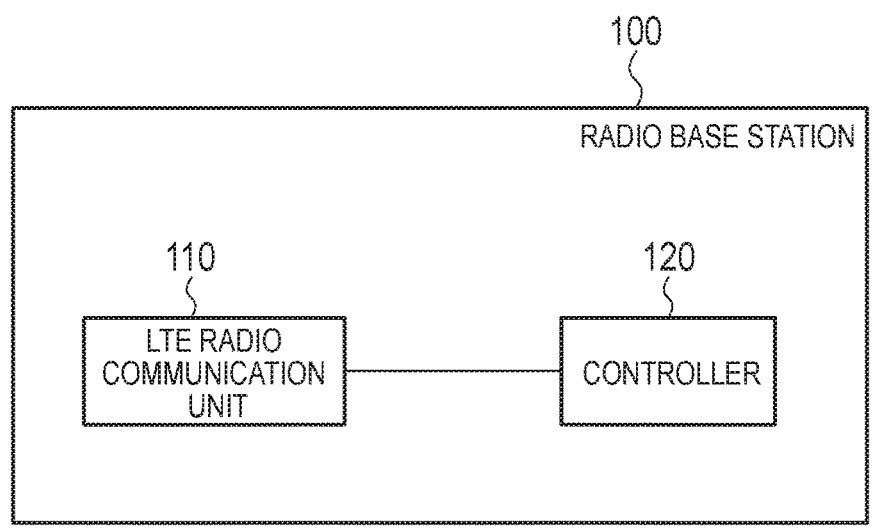
FIG. 3 is a block diagram illustrating a radio base station 100 according to the embodiment.

The radio base station according to the embodiment will be described, below. FIG. 3 is a block diagram illustrating the radio base station 100 according to the embodiment.

As illustrated in FIG. 3, the radio base station 100 includes an LTE radio communication unit 110 and a controller 120.

The LTE radio communication unit 110 has a function of performing radio communication with the radio terminal 10. For example, the LTE radio communication unit 110 regularly transmits a reference signal to the radio terminal 10. The LTE radio communication unit 110 transmits, as the determination parameter, the individual parameter and the broadcast parameter to the radio terminal 10. As described above, the LTE radio communication unit 110 notifies the radio terminal 10, by an RRC message (for example, RRC Connection Reconfiguration), of the individual parameter, and notifies the radio terminal 10, by an SIB (for example, WLAN-OffloadConfig-r12), of the broadcast parameter.

The controller 120 is configured by a CPU, a memory, and the like, and controls the radio base station 100.

(Protocol Stack)

Figure 4:
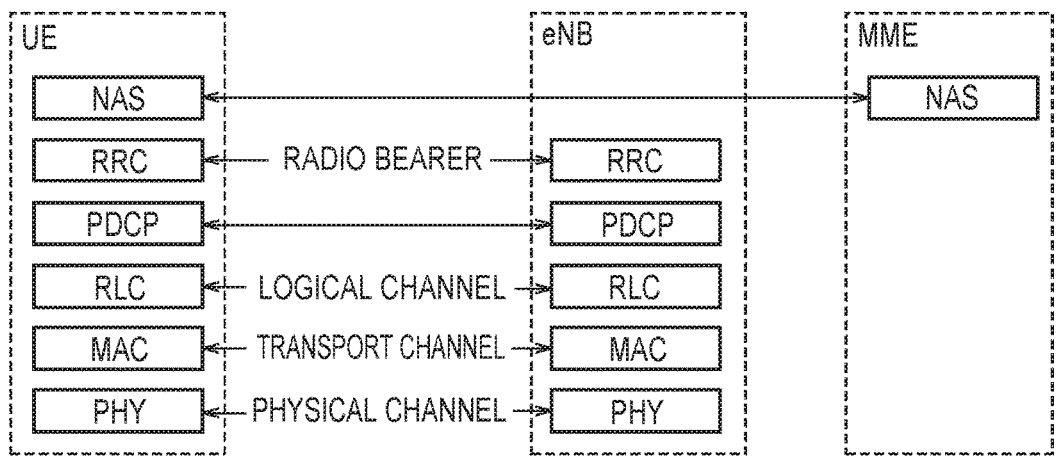
FIG. 4 is a diagram illustrating a protocol stack diagram according to the embodiment.

Hereinafter, the protocol stack according to the embodiment will be described. FIG. 4 is a diagram illustrating a protocol stack diagram according to the embodiment.

As illustrated in FIG. 4, the radio terminal 10 includes a PHY (Physical) layer, a MAC (Medium Access Control) layer, a RLC (Radio Link Control) layer, a PDCP (Packet Data Convergence Protocol) layer, an RRC (Radio Resource Control) and a NAS layer (Non-Access Stratum). The radio base station 100 has a PHY layer, a MAC layer, an RLC layer, a PDCP layer and an RRC layer. The PHY layer corresponds to the first layer of OSI reference model, the MAC layer, the RLC layer and the PDCP layer correspond to the second layer of the OSI reference model, and the RRC layer corresponds to the second layer of the OSI reference model.

The PHY layer performs encoding and decoding, modulation and demodulation, and antenna mapping and demapping. Between the PHY layer of the radio terminal 10 and the PHY layer of the radio base station 100, user data and control information are transmitted via the physical channel.

The MAC layer performs priority control of data, a retransmission process by hybrid ARQ (HARQ), and the like. Between the MAC layer of the radio terminal 10 and the MAC layer of the radio base station 100, user data and control information are transmitted via a transport channel. The MAC layer of the radio base station 100 includes a scheduler that determines a transport format of an uplink and a downlink (a transport block size and a modulation and coding scheme (MCS)) and a resource block to be assigned to the radio terminal 10.

The RLC layer performs data transmission to an RLC layer of a partner side by using the functions of the MAC layer and the PHY layer. Between the RLC layer of the radio terminal 10 and the RLC layer of the radio base station 100, user data and control information are transmitted via a logical channel.

The PDCP layer performs header compression and decompression, and encryption and decryption. Furthermore, it should also be noted that a transmitting entity for transmitting a data unit (PDCP PDU) or a receiving entity for receiving a data unit (PDCP PDU) is formed in the PDCP layer.

The RRC layer is defined only in a control plane dealing with control signal. Between the RRC layer of the radio terminal 10 and the RRC layer of the radio base station 100, control information (RRC messages) for various types of configuration are transmitted. The RRC layer controls the logical channel, the transport channel, and the physical channel in response to establishment, re-establishment, and release of a radio bearer. When there is a connection (RRC connection) between the RRC of the radio terminal 10 and the RRC of the radio base station 100, the radio terminal 10 is in an RRC connected state, when there is no connection (RRC connection) between the RRC of the radio terminal 10 and the RRC of the radio base station 100, the radio terminal 10 is in an RRC idle state.

The NAS layer is provided in the radio terminal 10 and an MME (Mobility Management Entity), and performs session management, mobility management, and the like.

(Radio Frame)

Figure 5:
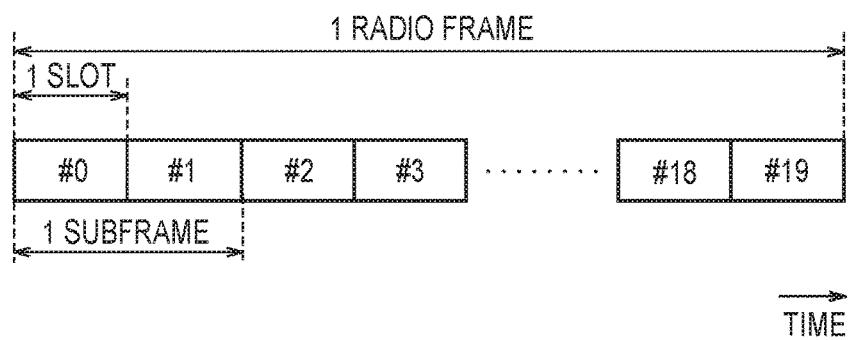
FIG. 5 is a diagram illustrating a radio frame according to the embodiment.

Hereinafter, the radio frame according to the embodiment will be described. FIG. 5 is a diagram illustrating a radio frame according to the embodiment. In the communication system 1, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One subcarrier and one symbol constitute one resource element (RE). Among radio resources assigned to the radio terminal 10, a frequency resource can be specified by a resource block and a time resource can be specified by a subframe (or slot).

(Notification Manner)

A notification manner of the information (Indication) indicating that the steering condition to the wireless LAN is satisfied will be described, below. As described above, the controller 13 notifies, when the steering condition to the wireless LAN is satisfied, a source radio base station provided in the mobile communication network of the Indication indicating that the steering condition to the wireless LAN is satisfied (hereinafter, may also be referred to as Indication). The notification manner of the Indication may be a manner as described below.

Firstly, the controller 13 may use the RRC message to notify the information (Indication) indicating that the steering condition to the wireless LAN is satisfied. A function of notifying the Indication is provided in the RRC layer.

In such a case, the controller 13 (RRC layer) may notify, in addition to the information (Indication) indicating that the steering condition to the wireless LAN is satisfied, information indicating a unit of traffic subject to the first switching process. The unit of traffic may be an APN (Access Point Name) indicating a connection partner of the radio terminal 10, and may be a radio bearer.

Alternatively, the controller 13 (RRC layer) may notify, for each radio bearer, the information (Indication) indicating that the steering condition to the wireless LAN is satisfied. In such a case, the controller 13 (RRC layer) may notify, along with identification information for identifying the radio bearer, the information (Indication) indicating that the steering condition to the wireless LAN is satisfied. The identification information may be a list including information for identifying a plurality of radio bearers.

Secondly, the controller 13 (PDCP layer) may use a PDCP protocol data unit to notify the information (Indication) indicating that the steering condition to the wireless LAN is satisfied. A function of notifying the Indication is provided in the PDCP layer.

In such a case, the controller 13 (PDCP layer) may notify, in addition to the information (Indication) indicating that the steering condition to the wireless LAN is satisfied, information indicating a unit of traffic subject to the first switching process. The traffic unit is a transmission entity or a reception entity.

Alternatively, the controller 13 (PDCP layer) may notify the information (Indication) indicating that the steering condition to the wireless LAN is satisfied, for each entity (the transmission entity or the reception entity). In such a case also, the controller 13 (RRC layer) notifies, along with identification information for identifying the entity, the information (Indication) indicating that the steering condition to the wireless LAN is satisfied.

In such a case, when the radio base station 100 is a node encompassing the function of the access point 200, the controller 120 of the radio base station 100 may use the PDCP layer as a layer common with both the mobile communication network and the wireless LAN. That is, data transmitted by the radio base station 100 is branched in the PDCP layer, and data received by the radio base station 100 converges in the PDCP layer.

Thirdly, the controller 13 (RLC layer) may use an RLC protocol data unit to notify the information (Indication) indicating that the steering condition to the wireless LAN is satisfied. A function of notifying the Indication is provided in the RLC layer.

In such a case, when the radio base station 100 is a node encompassing the function of the access point 200, the controller 120 of the radio base station 100 may use, as a layer common with both the mobile communication network and the wireless LAN, layers from the PHY layer to the RLC layer. That is, data transmitted by the radio base station 100 is branched in the RLC layer, and data received by the radio base station 100 converges in the RLC layer.

Fourthly, the controller 13 (MAC layer) may use an MAC protocol data unit to notify the information (Indication) indicating that the steering condition to the wireless LAN is satisfied. A function of notifying the Indication is provided in the MAC layer.

In such a case, when the radio base station 100 is a node encompassing the function of the access point 200, the controller 120 of the radio base station 100 may use, as a layer common with both the mobile communication network and the wireless LAN, layers from the PHY layer to the MAC layer. That is, data transmitted by the radio base station 100 is branched in the MAC layer, and data received by the radio base station 100 converges in the MAC layer. Alternatively, the controller 120 of the radio base station 100 may use, as the layer common both with the mobile communication network and the wireless LAN, an MAC CE (control element). That is, data transmitted by the radio base station 100 is branched in the MAC CE, and data received by the radio base station 100 converges in the MAC CE. The MAC CE is provided in the controller 120 of the radio base station 100.

(Notification Content)

A content to be notified, along with the information (Indication) indicating that the steering condition to the wireless LAN is satisfied, will be described, below. The controller 13 may notify, along with the information (Indication) indicating that the steering condition to the wireless LAN is satisfied, information described below.

Firstly, the controller 13 (MAC layer) may notify, in addition to the information (Indication) indicating that the steering condition to the wireless LAN is satisfied, information indicating a target access point constituting the wireless LAN. The target access point is the access point 200 constituting a connection target in the first switching process.

The information indicating the target access point is an identifier (WLAN identifier, for example) of the access point 200, for example. As a result, when it is possible to establish an interface for data transmission between the source radio base station and the access point 200, the source radio base station is capable of establishing the interface for data transmission with the target access point. As a result, the source radio base station is capable of performing data forwarding that accompanies the first switching process, to the target access point. Alternatively, the mobile communication network is capable of measuring throughput for data transmission between the target access point and he radio terminal 10.

The information indicating the target access point may include information indicating whether the target access point is the moving access point or the stationary access point. Thus, the source radio base station is capable of adjusting the determination parameter. For example, when the target access point is the moving access point, the source radio base station notifies the radio terminal 10 of the individual parameter in which the condition to perform the second switching process is not easily satisfied. As a result, when the radio terminal 10, together with the target access point, moves, a situation where the second switching process is performed immediately after the first switching process is performed is restrained, and repetition of an unnecessary switching process between the mobile communication network and the wireless LAN is restrained. On the other hand, when the target access point is the stationary access point, the source radio base station notifies the radio terminal 10 of the individual parameter having a value similar to the broadcast parameter. Alternatively, the source radio base station controls the switching process by the broadcast parameter without notifying the individual parameter.

Secondly, the controller 13 may notify, in addition to the information (Indication) indicating that the steering condition to the wireless LAN is satisfied, information indicating which of the individual parameter or the broadcast parameter is used as the determination parameter used for determining whether the steering condition to the wireless LAN is satisfied. The information indicating which of the individual parameter or the broadcast parameter is used as the determination parameter may be used by the source radio base station for optimizing the determination parameter.

Thirdly, the controller 13 may notify, in addition to the information (Indication) indicating that the steering condition to the wireless LAN is satisfied, information indicating a value of the determination parameter used for determining whether the steering condition to the wireless LAN is satisfied. The information indicating the value of the determination parameter may be used by the source radio base station for optimizing the determination parameter.

(Communication Method)

A communication method according to the embodiment will be described, below. FIG. 6 is a flowchart illustrating the communication method according to the embodiment. The flow illustrated in FIG. 6 is executed by the radio terminal 10. Here, a case where the switching process is the first switching process, will be described.

As illustrated in FIG. 6, in step S10, the radio terminal 10 determines whether or not the condition to perform the first switching process (steering condition to the wireless LAN) is satisfied over a predetermined period. When the determination result is YES, a process of step S11 is performed. When the determination result is NO, a series of processes is ended (that is, the first switching process is not performed).

In step S11, the radio terminal 10 notifies the source radio base station of the information (Indication) indicating that the steering condition to the wireless LAN is satisfied. The notification manner and the content to be notified are as described above.

In step S12, the radio terminal 10 performs the first switching process of switching the connection target from the mobile communication network to the wireless LAN.

(Operation and Effect)

According to the embodiment-based radio terminal 10, the controller 13 notifies, when the steering condition to the wireless LAN is satisfied, the source radio base station provided in the mobile communication network of information indicating that the steering condition to the wireless LAN is satisfied ("move-traffic-to-WLAN indication", for example). Thus, a situation where the source radio base station retains context information (UE Context) of the radio terminal 10 is restrained, and the notification of the PDCCH from the source radio base station to the radio terminal 10 is also restrained. By extension, in a case where the switching process from the mobile communication network to the wireless LAN is performed, it is possible to restrain monitoring by the radio terminal 10 of the unnecessary PDCCH.

[First Modification]

A first modification of the embodiment will be described, below. Description proceeds with a focus on a difference from the embodiment, below.

In the first modification, the radio terminal 10 (controller 13 notifies the source radio base station of, in addition to the information (Indication) indicating that the steering condition to the wireless LAN is satisfied, information indicating a target access point constituting the wireless LAN. The source radio base station notifies the target access point of the context information (UE Context) of the radio terminal 10. The target access point notifies, when the connection target is switched from the wireless LAN to the mobile communication network, a target radio base station provided in the mobile communication network, of the context information of the radio terminal 10. The target radio base station is the radio base station 100 constituting the connection target in the second switching process.

(Communication Method)

A communication method according to the first modification will be described, below. FIG. 7 and FIG. 8 are sequence diagrams illustrating the communication method according to the first modification.

As illustrated in FIG. 7, in step S20, the connection target of the radio terminal 10 is the mobile communication network.

In step S21, the radio terminal 10 determines whether or not the condition to perform the first switching process (steering condition to the wireless LAN) is satisfied over a predetermined period. Here, description continues with an assumption that the determination result is YES.

In step S22, the radio terminal 10 notifies the source radio base station (here, the radio base station 100) of the information (Indication) indicating that the steering condition to the wireless LAN is satisfied. The notification manner of the information (Indication) indicating that the steering condition to the wireless LAN is satisfied and the content to be notified are similar to those in the embodiment. The information (Indication) indicating that the steering condition to the wireless LAN is satisfied includes identification information (an SSID; Service Set Identifier, for example) of the target access point (here, the access point 200).

In step S23, the source radio base station notifies the target access point (here, the access point 200) of the context information (UE Context) of the radio terminal 10. The source radio base station may discard, after notifying the target access point of the context information of the radio terminal 10, the context information after a predetermined time period elapses. The source radio base station may restrain (stop), when retaining, after notifying the target access point of the context information of the radio terminal 10, the context information, a resource allocation, for the PDCCH, to the radio terminal (here, the radio terminal 10) corresponding to the context information.

In step S24, the radio terminal 10 performs the first switching process of switching the connection target from the mobile communication network to the wireless LAN.

In step S25, the connection target of the radio terminal 10 is the wireless LAN. It is noted that in a case where the first switching process of switching the connection target from the mobile communication network to the wireless LAN is performed by each unit of traffic, in a state where the connection target of some of the traffic is already switched to the wireless LAN, the connection target of some or all of the remaining traffic may be switched to the wireless LAN. The unit of traffic may be an APN (Access Point Name) indicating a connection partner of the radio terminal 10, and may be a radio bearer, as described above.

Subsequently, as illustrated in FIG. 8, in step S26, the radio terminal 10 determines whether or not the condition to perform the second switching process (steering condition to the mobile communication network) is satisfied over a predetermined period. Here, description continues with an assumption that the determination result is YES.

In step S27, the radio terminal 10 notifies the target access point (here, the access point 200) of the information (Indication) indicating that the steering condition to the mobile communication network is satisfied. In such a case, the radio terminal 10 preferably notifies, in addition to the information (Indication) indicating that the steering condition to the mobile communication network is satisfied, information for identifying the connection target (target radio base station) in the second switching process.

In step S28, the target access point (here, the access point 200) notifies the target radio base station (here, the radio base station 100) provided in the mobile communication network of the context information (UE Context) of the radio terminal 10.

In step S29, the radio terminal 10 performs the second switching process of switching the connection target from the wireless LAN to the mobile communication network.

In step S30, the connection target of the radio terminal 10 is the mobile communication network.

It is noted that in the example illustrated in FIG. 7 and FIG. 8, a case is illustrated where the target radio base station in the second switching process is the same as the source radio base station in the first switching process. However, the first modification is not limited thereto. The target radio base station in the second switching process may be different from the source radio base station in the first switching process.

(Operation and Effect)

According to the communication system 1 based on the first modification, the source radio base station notifies the target access point of the context information (UE Context) of the radio terminal 10. Thus, in the mobile communication network and the wireless LAN, it is possible to utilize the context information of the radio terminal 10. By extension, as the identification information sharable both to the mobile communication network and the wireless LAN, it is possible to utilize the context information of the radio terminal 10.

According to the communication system 1 based on the first modification, the target access point notifies the target radio base station of the context information (UE Context) of the radio terminal 10. Therefore, in the target radio base station, it is possible to omit a process of setting of the context information of the radio terminal 10, for example.

[Second Modification]

A second modification of the embodiment will be described, below. Description proceeds with a focus on a difference from the embodiment, below.

Specifically, in the embodiment, the radio terminal 10 (controller 13) directly transmits the information (Indication) indicating that the steering condition to the wireless LAN is satisfied, to the source radio base station.

On the other hand, in the second modification, the radio terminal 10 (controller 13) notifies, by way of a predetermined node, the source radio base station of the information (Indication) indicating that the steering condition to the wireless LAN is satisfied. The predetermined node is an MME arranged above the source radio base station, a wireless LAN gateway constituting an interface between the mobile communication network and the wireless LAN, or a target access point constituting the wireless LAN. It is noted that when the predetermined node is the MME or the wireless LAN gateway, the above-described NAS layer notifies the information (Indication) indicating that the steering condition to the wireless LAN is satisfied. On the other hand, when the predetermined node is the target access point, a functional block configured to process the wireless LAN notifies the information (Indication) indicating that the steering condition to the wireless LAN is satisfied.

Further, in the second modification, the source radio base station transmits, in response to reception of the information (Indication) indicating that the steering condition to the wireless LAN is satisfied, a message (RRC Connection Release, for example) instructing a release of a connection between the source radio base station and the radio terminal 10, to the radio terminal 10.

(Communication Method)

A communication method according to the second modification will be described, below. FIG. 9 is a sequence diagram illustrating the communication method according to the second modification.

As illustrated in FIG. 9, in step S40, the connection target of the radio terminal 10 is the mobile communication network.

In step S41, the radio terminal 10 determines whether or not the condition to perform the first switching process (steering condition to the wireless LAN) is satisfied over a predetermined period. Here, description continues with an assumption that the determination result is YES.

In step S42, the radio terminal 10 notifies a predetermined node 300 of the information (Indication) indicating that the steering condition to the wireless LAN is satisfied.

In step S43, the predetermined node 300 notifies the source radio base station (here, the radio base station 100) of the information (Indication) indicating that the steering condition to the wireless LAN is satisfied.

In step S44, the source radio base station transmits, to the radio terminal 10, a message (RRC Connection Release) for instructing a release of the connection between the source radio base station and the radio terminal 10. The source radio base station may discard the context information of the radio terminal 10 after a predetermined time period elapses when retaining, after transmitting, to the radio terminal 10, the message instructing a release the connection between the source radio base station and the radio terminal 10, the context information (UE Context) of the radio terminal 10.

In step S45, the radio terminal 10 performs the first switching process of switching the connection target from the mobile communication network to the wireless LAN.

In step S46, the connection target of the radio terminal 10 is the wireless LAN.

(Operation and Effect)

According to the communication system 1 based on the second modification, the source radio base station transmits, in response to reception of the information (Indication) indicating that the steering condition to the wireless LAN is satisfied, a message (RRC Connection Release, for example)

instructing a release of a connection (RRC connection) between the source radio base station and the radio terminal 10, to the radio terminal 10. Thus, the RRC connection is unfailingly released along with the first switching process, and therefore, it is possible to avoid monitoring by the radio terminal 10 of an unnecessary PDCCH.

[Third Modification]

A third modification of the embodiment will be described, below. Description proceeds with a focus on a difference from the embodiment, below.

Specifically, in the embodiment, the radio terminal 10 (controller 13) determines whether or not the condition to perform the first switching process (steering condition to the wireless LAN) is satisfied over a predetermined period.

On the other hand, in the third modification, the radio base station 100 (controller 120) determines whether or not the condition to perform the first switching process (steering condition to the wireless LAN) is satisfied over a predetermined period.

More particularly, the radio base station 100 (LTE radio communication unit 110) transmits, to the radio terminal 10, measurement setting information (Config) indicating that the signal received from the wireless LAN should be measured. In the third modification, the measurement setting information includes information for specifying a category (RSSI, for example) of second information at a wireless LAN side that the radio terminal 10 should measure. The measurement setting information may include information for specifying a category of first information at a mobile communication network side that the radio terminal 10 should measure. The radio base station 100 (LTE radio communication unit 110) receives, from the radio terminal 10, a measurement report (Report) of the information specified by the measurement setting information. The measurement report (Report) includes at least identification information (here, an SSID; Service Set Identifier, for example) of the target access point (here, the access point 200). In the third modification, the measurement report (Report) includes a measurement result (RSSI, for example) of the second information at the wireless LAN side. The measurement report (Report) may include the measurement result of the first information at the mobile communication network side.

The radio base station 100 (controller 120) determines on the basis of the measurement report (Report) whether or not the condition to perform the first switching process (steering condition to the wireless LAN) is satisfied over a predetermined period.

The radio base station 100 (LTE radio communication unit 110) preferably notifies the radio terminal 10 of the information (Indication) indicating that the steering condition to the wireless LAN is satisfied. Alternatively, the radio base station 100 (LTE radio communication unit 110) may notify the radio terminal 10 of information (Indication) for instructing a switching of the connection target from the mobile communication network to the wireless LAN.

The radio base station 100 (controller 120) discards, when the steering condition to the wireless LAN is satisfied, the context information (UE Context) of the radio terminal 10. In such a case, the radio base station 100 (controller 120) may discard the context information (UE Context) of the radio terminal 10 when a constant period elapses since the steering condition to the wireless LAN is satisfied. Alternatively, the radio base station 100 (controller 120) may discard the context information (UE Context) of the radio terminal 10 when a constant period elapses from notifying the above-described information (Indication).

Further, it should be noted that in a case where the first switching process is performed for each unit of traffic, when the connection target of all the traffic is switched to the wireless LAN, the radio base station 100 (controller 120) discards the context information (UE Context) of the radio terminal 10. In other words, even when the connection target of some of the traffic is switched to the wireless LAN, the radio base station 100 (controller 120) retains, when the connection target of the remaining traffic is the mobile communication network, the context information (UE Context) of the radio terminal 10.

Further, the radio base station 100 (controller 120) may restrain (stop), when the steering condition to the wireless LAN is satisfied, upon retaining, without discarding, the context information (UE Context) of the radio terminal 10, the resource allocation for the PDCCH to the radio terminal (in this case, the radio terminal 10) corresponding to the context information.

It is noted that the first information at the mobile communication network side is a measurement result (RSRPmeas) of a signal level of a received signal (RSRP; Reference Signal Received Power) and a measurement result (RSRQmeas) of a signal quality of a received signal (RSRQ; Reference Signal Received Quality). The second information at a wireless LAN side is a channel utilization value of a wireless LAN, a backhaul value of a wireless LAN, and a signal intensity of a received signal (RSSI; Received Signal Strength Indicator), for example.

(Communication Method)

A communication method according to the third modification will be described, below. FIG. 10 is a sequence diagram illustrating the communication method according to the third modification.

As illustrated in FIG. 10, in step S50, the connection target of the radio terminal 10 is the mobile communication network.

In step S51, the radio base station 100 transmits, to the radio terminal 10, the measurement setting information (Config) indicating that the signal received from the wireless LAN should be measured. In the third modification, the measurement setting information includes information for specifying a category (RSSI, for example) of second information at a wireless LAN side that the radio terminal 10 should measure. The measurement setting information may include information for specifying a category of first information at a mobile communication network side that the radio terminal 10 should measure.

In step S52, the radio terminal 10 transmits, to the radio base station 100, the measurement report (Report) of the information specified by the measurement setting information. The measurement report (Report) includes at least identification information (here, an SSID, for example) of the target access point (here, the access point 200). In the third modification, the measurement report (Report) includes a measurement result (RSSI, for example) of the second information at the wireless LAN side. The measurement report (Report) may include the measurement result of the first information at the mobile communication network side.

In step S53, the radio base station 100 determines whether or not the condition to perform the first switching process (steering condition to the wireless LAN) is satisfied over a predetermined period. Here, description continues with an assumption that the determination result is YES.

In step S54, the radio base station 100 notifies the target access point (here, the access point 200) of the context information (UE Context) of the radio terminal 10.

In step S55, the radio base station 100 notifies the radio terminal 10 of the information (Indication) indicating that the steering condition to the wireless LAN is satisfied. Alternatively, the radio base station 100 may notify the radio terminal 10 of information (Indication) for instructing a switching of the connection target from the mobile communication network to the wireless LAN.

In step S56, the radio terminal 10 performs the first switching process of switching the connection target from the mobile communication network to the wireless LAN.

Here, the radio base station 100 may discard the context information (UE Context) of the radio terminal 10 when a constant period elapses since the steering condition to the wireless LAN is satisfied. Alternatively, the radio base station 100 may discard the context information (UE Context) of the radio terminal 10 when a constant period elapses from notifying the above-described information (Indication). That is, the radio base station 100 preferably discard, after the first switching process is performed by the radio terminal 10, the context information (UE Context) of the radio terminal 10. It is noted that the radio base station 100 may restrain (stop), when the steering condition to the wireless LAN is satisfied, upon retaining the context information (UE Context) of the radio terminal 10, the resource allocation for the PDCCH to the radio terminal (in this case, the radio terminal 10 corresponding to the context information.

In step S57, the connection target of the radio terminal 10 is the wireless LAN. It is noted that in a case where the first switching process of switching the connection target from the mobile communication network to the wireless LAN is performed by each unit of traffic, in a state where the connection target of some of the traffic is already switched to the wireless LAN, the connection target of some or all of the remaining traffic may be switched to the wireless LAN. The unit of traffic may be an APN (Access Point Name) indicating a connection partner of the radio terminal 10, and may be a radio bearer, as described above.

In such a case, it should be noted that in a case where the connection target of all the traffic is switched to the wireless LAN, the radio base station 100 discards the context information (UE Context) of the radio terminal 10. In other words, even when the connection target of some of the traffic is switched to the wireless LAN, the radio base station 100 (controller 120) retains, when the connection target of the remaining traffic is the mobile communication network, the context information (UE Context) of the radio terminal 10.

(Operation and Effect) in the third modification, the radio base station 100 transmits, to the radio terminal 10, the measurement setting information (Config) indicating that the signal received from the wireless LAN should be measured, and receives, from the radio terminal 10, the measurement report (Report) includes at least the identification information (SSID, for example) of the target access point (here, the access point 200). The radio base station 100 (controller 120) determines on the basis of the measurement report (Report) whether or not the condition to perform the first switching process (steering condition to the wireless LAN) is satisfied over a predetermined period.

Thus, the source radio base station is capable of discarding the context information (UE Context) of the radio terminal 10, and therefore, a situation where the context information of the radio terminal 10 is retained is restrained, and the notification of the PDCCH from the source radio base station to the radio terminal 10 is also restrained. By extension, in a case where the switching process from the mobile communication network to the wireless LAN is performed, it is possible to restrain monitoring by the radio terminal 10 of the unnecessary PDCCH.

[Fourth Modification]

A fourth modification of the embodiment will be described, below. Description proceeds with a focus on a difference from the embodiment, below.

Specifically, in the third modification, the measurement report (Report) includes, in addition to the identification information (an SSID, for example) of the access point 200, the measurement result (RSSI, for example) of the second information at the wireless LAN side.

On the other hand, in the fourth modification, the measurement report (Report) includes the identification information (an SSID) of the access point 200 only.

More particularly, the radio base station 100 (controller 120) previously acquires, from the access point 200, information for calculating estimated throughput of the access point 200. Then, the radio base station 100 (controller 120) specifies, on the basis of the identification information (an SSID, for example) of the access point 200 included in the measurement report (Report), the access point 200, and calculates the estimated throughput of the specified access point 200. The radio base station 100 (controller 120) determines on the basis of the estimated throughput of the access point 200 whether or not the condition to perform the first switching process (steering condition to the wireless LAN) is satisfied over a predetermined period.

Here, the information for calculating the estimated throughput of the access point 200 is "BSS Load", "UE Average data rate", "BSS Average Access Delay/BSS AC Access Delay", "WLAN Metrics", and the like. For example, "Parameters exchanged from the WLAN to 3GPP nodes" in the section 5.1.2 of 3GPP TR37.870 should be referred to for the detail of these information.

The radio base station 100 calculates the throughput in accordance with the following equation, for example.

Estimated throughput=min{(WLAN maximum throughput [bps])/(BSSload[%]),(WANMetrics [bps])}

[Fifth Modification]

A fifth modification of the embodiment will be described, below. Description proceeds with a focus on a difference from the embodiment, below.

Specifically, in the embodiment, the connection target (target access point) in the first switching process is selected by the radio terminal 10.

On the other hand, in the fifth modification, the connection target (target access point) in the first switching process is selected through cooperation between the radio terminal 10 and the radio base station 100.

(Communication Method)

A communication method according to the fifth modification will be described, below. FIG. 11 is a sequence diagram illustrating the communication method according to the fifth modification.

As illustrated in FIG. 11, in step S60, the connection target of the radio terminal 10 is the mobile communication network.

In step S61, the radio terminal 10 determines whether or not the condition to perform the first switching process (steering condition to the wireless LAN) is satisfied over a predetermined period. Here, description continues with an assumption that the determination result is YES.

In step S62, the radio terminal 10 notifies the source radio base station (here, the radio base station 100) of the information (Indication) indicating that the steering condition to the wireless LAN is satisfied. It should be noted that in the fifth modification, even when the steering condition to the wireless LAN is satisfied, step S65 (first switching process) is not immediately performed.

In the fifth modification, there is illustrated, as an example, a case where there are a plurality of access points 200 as a wireless LAN (that is, the access point 200) to which the radio terminal 10 is connectable, and the steering condition to the wireless LAN is satisfied in the plurality of wireless LANs.

In such a case, in step S62, the radio terminal 10 notifies the source radio base station (here, the radio base station 100) of information (Indication) including a list of identification information (a WLANID or an SSID) of the plurality of wireless LANs that satisfy the steering condition to the wireless LAN (hereinafter, WLAN list). It is preferable that the plurality of wireless LANs (access points 200) included in the WLAN list are given a priority order. The priority order may be given by a user preference, and may be given in the order of larger RSSI.

In step S63, the radio base station 100 calculates the estimated throughput for each of the plurality of wireless LANs (access points 200) included in the WLAN list. The method of calculating the estimated throughput is in much the same way as in the above-described fourth modification.

In step S64, the radio base station 100 transmits, to the radio terminal 10, response information (Response) including the connection target (target access point) in the first switching process. The response information (Response) may include a connection target list of the plurality of wireless LANs (target access points). It is preferable that the plurality of wireless LANs (target access points) included in the connection target list are given a priority order. The priority order may be given in the order of larger estimated throughput. Alternatively, the priority order may be given on the basis, in addition to the estimated throughput calculated in step S63, of the priority order given to the plurality of wireless LANs (access points 200) included in the WLAN list received in step S62.

In step S65, the radio terminal 10 performs the first switching process of switching the connection target from the mobile communication network to the wireless LAN. Here, when the response information (Response) includes the connection target list of a plurality of wireless LANs (target access points), the radio terminal 10 decides the connection target (target access point) according to the priority order, and performs the first switching process of switching the connection target to the decided connection target (target access point).

In step S66, the connection target of the radio terminal 10 is the wireless LAN. It is noted that in a case where the first switching process of switching the connection target from the mobile communication network to the wireless LAN is performed by each unit of traffic, in a state where the connection target of some of the traffic is already switched to the wireless LAN, the connection target of some or all of the remaining traffic may be switched to the wireless LAN. The unit of traffic may be an APN (Access Point Name) indicating a connection partner of the radio terminal 10, and may be a radio bearer, as described above.

It is noted that in the fifth modification, the priority order of the plurality of wireless LANs (target access points) included in the connection target list is given on the basis of the estimated throughput calculated in step S63. However, the embodiment is not limited thereto. The priority order of the plurality of wireless LANs included in the connection target list may be defined on the basis of the type of wireless LAN. The type of wireless LAN may be defined on the basis of presence or absence of a collaboration relationship between the mobile communication network and the wireless LAN in which the radio base station 100 is arranged, for example. In such a case, the process of step S63 may be omitted.

Further, the mobile communication network may select whether or not to apply a cooperation scheme in which the connection target (target access point) in the first switching process is selected by the cooperation between the radio terminal 10 and the radio base station 100. For example, in step S60, the radio base station 100 may notify the radio terminal 10 of the information indicating whether or not to apply the collaboration scheme. When the collaboration scheme is applied, upon selection of the connection target (target access point) in the first switching process, a procedure of the fifth modification (FIG. 11) is applied. On the other hand, when the collaboration scheme is not applied, upon selection of the connection target (target access point) in the first switching process, a procedure of the embodiment or the first modification (FIG. 6 or FIG. 7) is applied.

[Other Embodiments]

It should not be understood that the above-described embodiment limits the present application. From this disclosure, various alternative embodiments, examples, and operational technologies will be obvious to those skilled in the art.

In the embodiment, the source radio base station may transmit, in response to reception of the information (Indication) indicating that the steering condition to the wireless LAN is satisfied, a message (RRC Connection Release, for example) instructing a release of a connection (RRC connection) between the source radio base station and the radio terminal 10, to the radio terminal 10.

In the embodiment, the source radio base station may discard the context information (UE Context) of the radio terminal 10, in response to reception of the information (Indication) indicating that the steering condition to the wireless LAN is satisfied.

In the embodiment, a case where the condition is satisfied over a predetermined period is described, and in such a case, even when there temporarily is a state where the condition is not satisfied during the predetermined period, it is possible to determine that the condition is satisfied over an entire predetermined period.

A program may be provided which causes a computer to execute each process performed by the radio terminal 10 and the radio base station 100. Further, the program may be recorded on a computer-readable medium. When the computer-readable medium is used, it is possible to install the program in a computer. Here, the computer-readable medium recording therein the program may be a non-transitory recording medium. The non-transitory recording medium is not particularly limited; the examples thereof may be a recording medium such as a CD-ROM and a DVD-ROM.

Alternatively, a chip may be provided which is configured by: a memory in which a program for performing each process performed by the radio terminal 10 and the radio base station 100 is stored; and a processor for executing the program stored in the memory.

In the embodiment, the LTE is mentioned as an example of the mobile communication network. However, the embodiment is not limited thereto. As the mobile communication network, a network provided by a communication carrier may suffice. Therefore, the mobile communication network may be UMTS (Universal Mobile Telecommunications System) or may be GSM (registered trademark) (global system for mobile communications).

CROSS REFERENCE

The entire content of Japanese Patent Application No. 2014-240647 (filed on Nov. 27, 2014) is incorporated in the present specification by reference.

INDUSTRIAL APPLICABILITY

The present application is useful in the field of communication.

The invention claimed is:

1. A radio terminal comprising:
a controller containing at least one processor and at least one memory, and configured to perform a switching process of switching a connection target from a Long Term Evolution (LTE) network to a wireless LAN, wherein
the controller is configured to determine, on the basis of a determination parameter used for determining whether to perform the switching process, whether or not a condition to perform the switching process is satisfied,
the controller is further configured to transmit, in response to determining that the condition to perform the switching process is satisfied, first information indicating that the condition to perform the switching process is satisfied, to a source radio base station provided in the LTE network,
the condition includes a first condition and a second condition,
the first condition is a condition which should be satisfied at the LTE network side,
the second condition is a condition which should be satisfied at the wireless LAN side,
the first information indicates that both the first condition and the second condition are satisfied,
the determination parameter used for the determining is an individual parameter individually notified from the LTE network or a broadcast parameter broadcast from the LTE network, and
the controller is further configured to transmit, in addition to the first information, determination parameter information indicating which of the individual parameter or the broadcast parameter is used as the determination parameter, to the source radio base station in the LTE network.

2. The radio terminal according to claim 1, wherein
the controller is further configured to use an RRC message to transmit the first information.

3. The radio terminal according to claim 2, wherein
the controller is further configured to transmit, in addition to the first information, second information indicating a unit of traffic subject to the switching process.

4. The radio terminal according to claim 2, wherein
the controller is further configured to transmit, for each traffic subject to the switching process, information indicating that the condition to perform the switching process is satisfied.

5. The radio terminal according to claim 1, wherein
the controller is further configured to use a PDCP protocol data unit to transmit the first information.

6. The radio terminal according to claim 1, wherein
the controller is further configured to use an RLC protocol data unit to transmit the first information.

7. The radio terminal according to claim 1, wherein
the controller is further configured to use an MAC protocol data unit to transmit the first information.

8. The radio terminal according to claim 1, wherein
the controller is further configured to transmit, in addition to the first information, third information indicating a target access point constituting the wireless LAN.

9. The radio terminal according to claim 8, wherein
the third information includes information indicating which of a moving access point or a stationary access point the target access point is.

10. The radio terminal according to claim 1, wherein
the controller is further configured to transmit, in addition to the first information, fifth information indicating a value of the determination parameter.

11. A communication system comprising:
a radio terminal configured to perform a switching process of switching a connection target from a Long Term Evolution (LTE) network to a wireless LAN; and
a source radio base station provided in the LTE network, wherein
the radio terminal determines, on the basis of a determination parameter used for determining whether to perform the switching process, whether or not a condition to perform the switching process is satisfied,
in response to determining that the condition to perform the switching process is satisfied, the radio terminal transmits first information indicating that the condition to perform the switching process is satisfied to the source radio base station,
the condition includes a first condition and a second condition,
the first condition is a condition which should be satisfied at the LTE network side,
the second condition is a condition which should be satisfied at the wireless LAN side,
the first information indicates that both the first condition and the second condition are satisfied,
the determination parameter used for the determining is an individual parameter individually notified from the LTE network or a broadcast parameter broadcast from the LTE network, and
the radio terminal further transmits, in addition to the first information, determination parameter information indicating which of the individual parameter or the broadcast parameter is used as the determination parameter, to the source radio base station.

12. The communication system according to claim 11, wherein
the radio terminal further transmits, in addition to the first information, information indicating a target access point constituting the wireless LAN,
the source radio base station transmits context information of the radio terminal to the target access point, and
in response to the connection target being switched from the wireless LAN to the LTE network, the target access point transmits the context information of the radio terminal to a target radio base station provided in the LTE network.

13. The communication system according to claim 11, wherein
the radio terminal transmits the first information to the source radio base station via a predetermined node,
the predetermined node is an MME arranged above the source radio base station, a wireless LAN gateway constituting an interface between the LTE network and the wireless LAN, or a target access point constituting the wireless LAN, the predetermined node transmits the first information to the source radio base station, and the source radio base station transmits, in response to reception of the first information indicating, a message instructing a release of a connection between the source radio base station and the radio terminal, to the radio terminal.

* * * * *